April 29, 1958  D. L. HALL ET AL  2,832,164
TRANSFER APPLYING MACHINE
Filed Aug. 15, 1956  4 Sheets-Sheet 3
FIG. 2B.
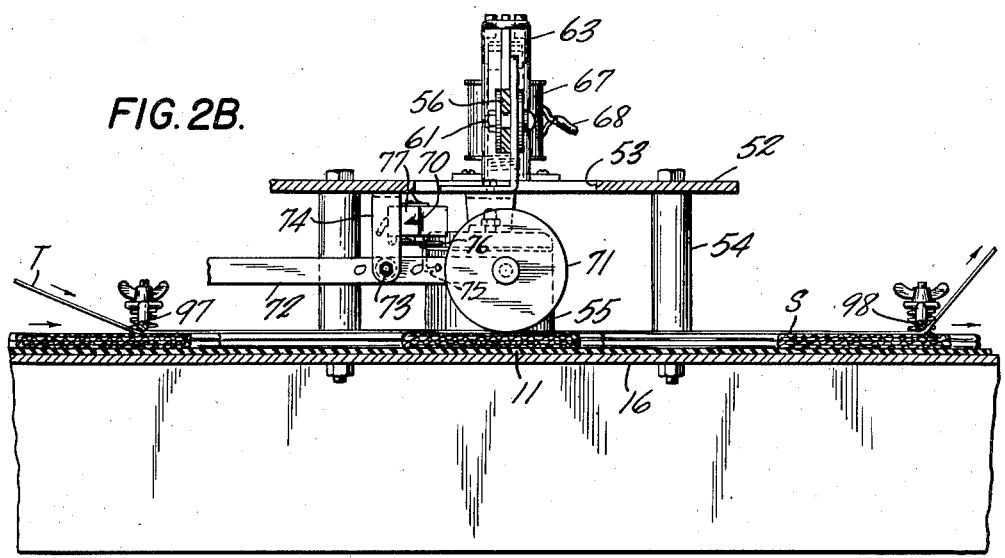
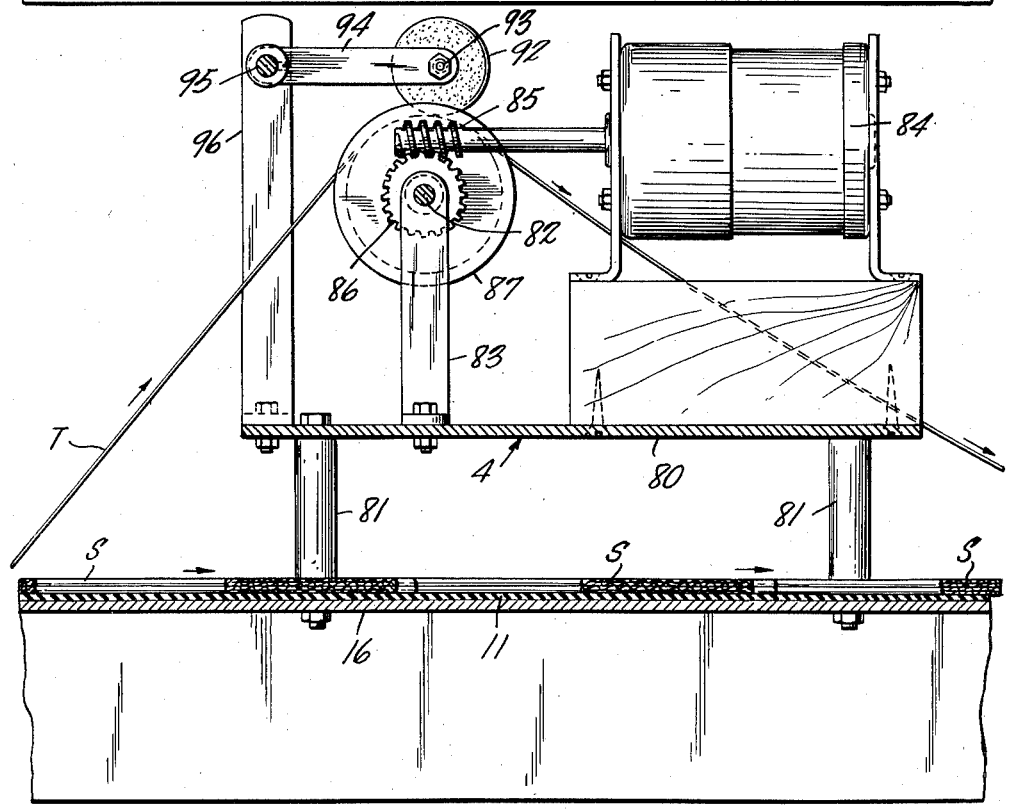
FIG. 2C.

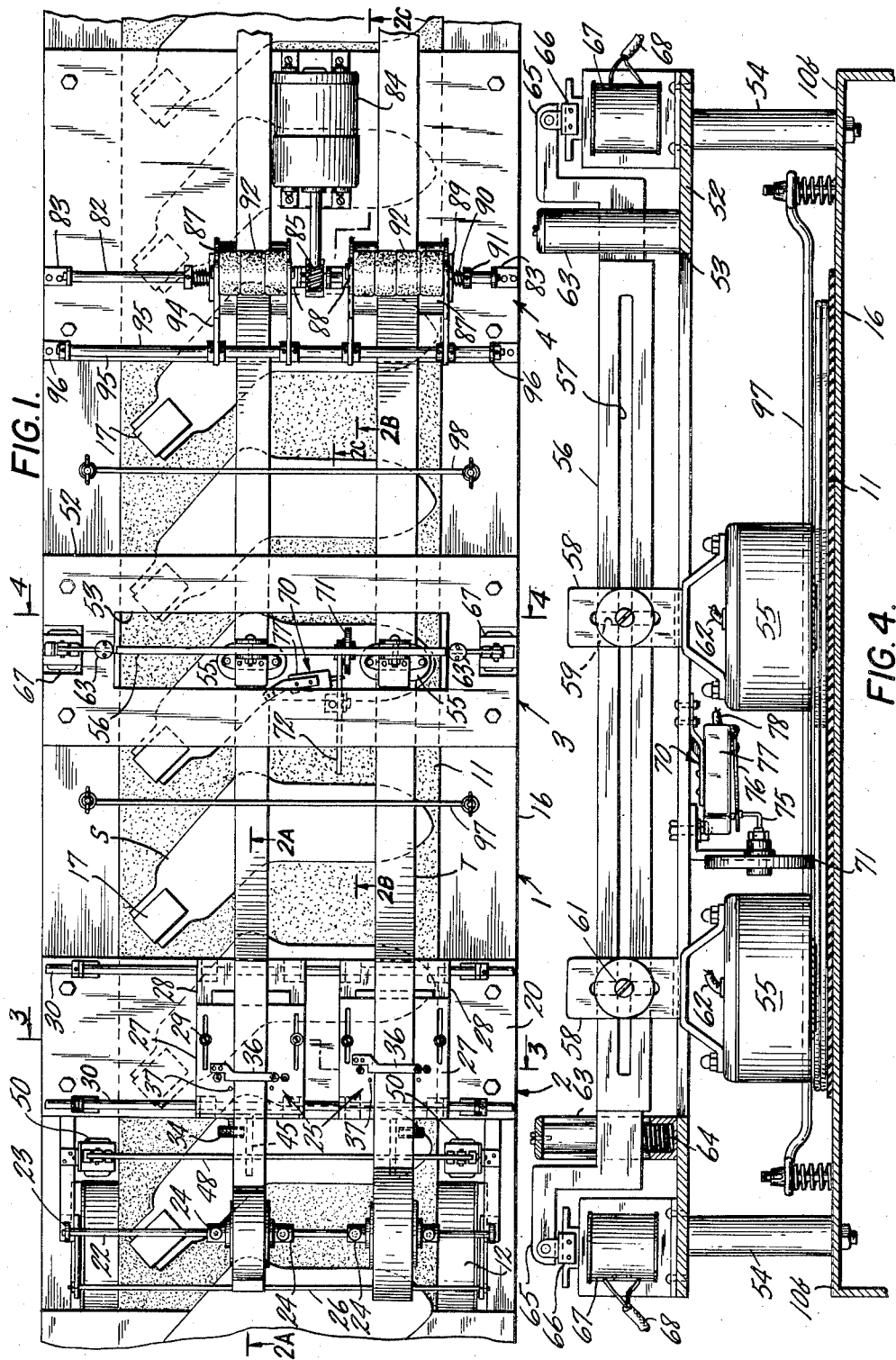

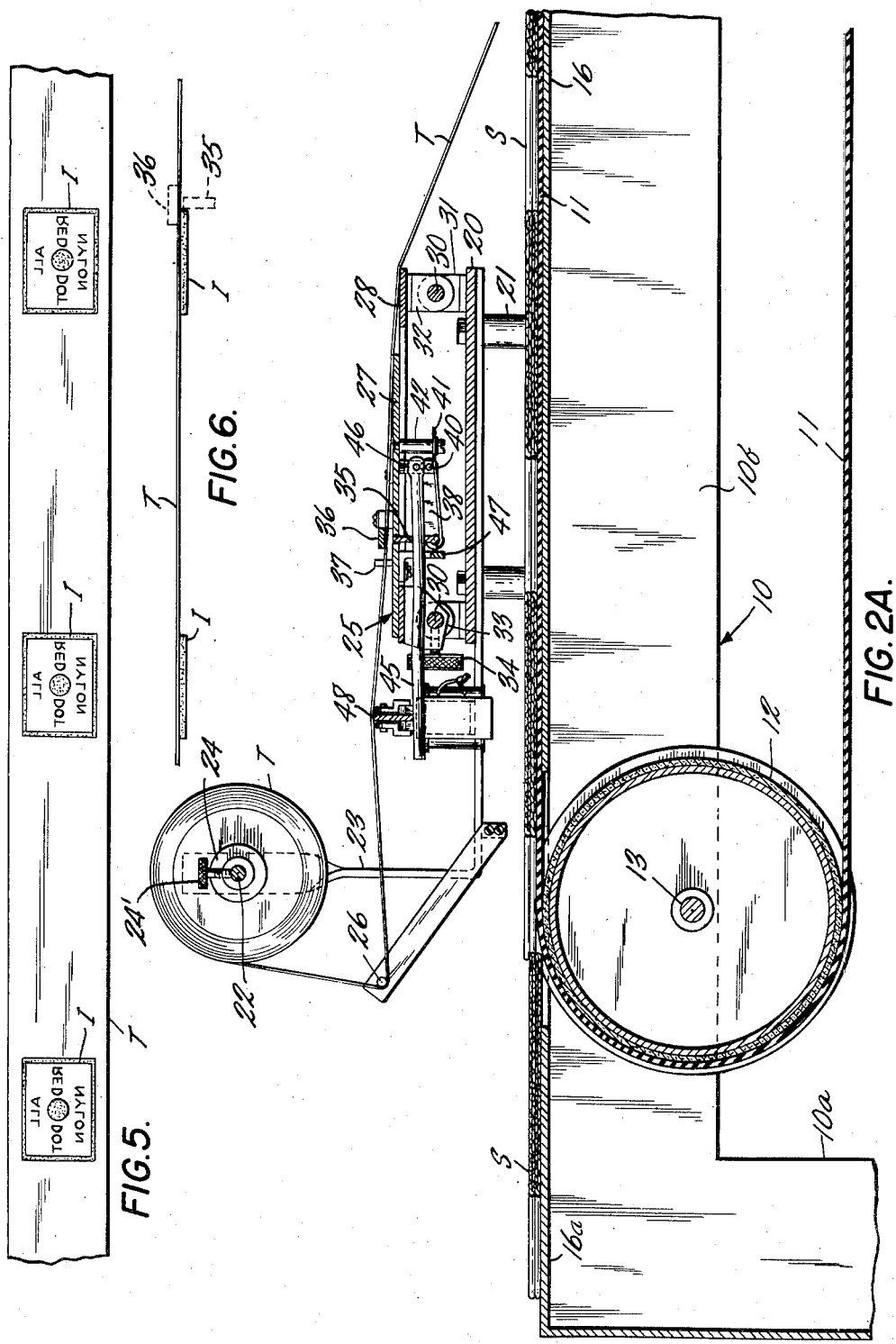

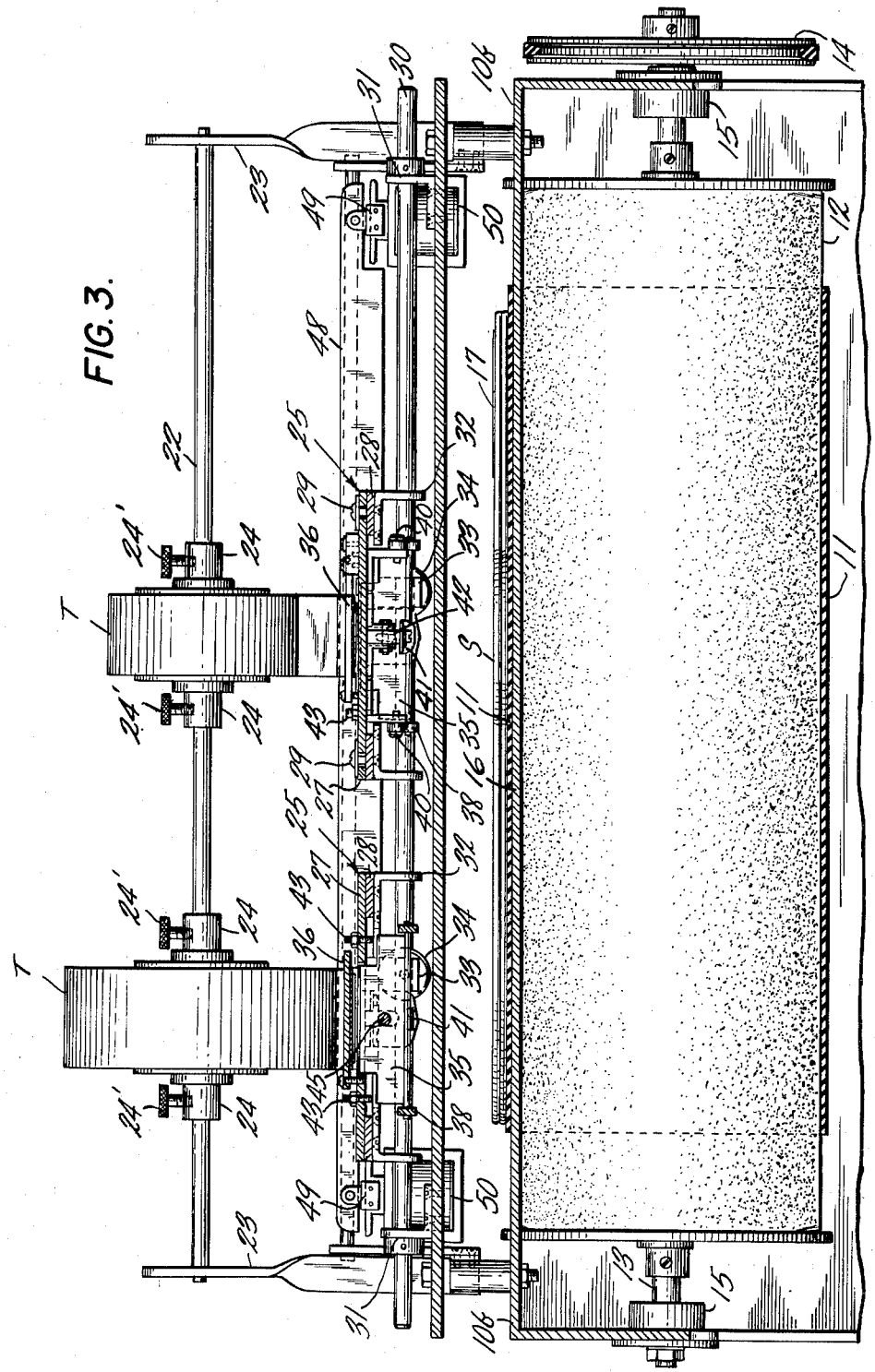

United States Patent Office 2,832,164
Patented Apr. 29, 1958

2,832,164

TRANSFER APPLYING MACHINE

Doyle L. Hall, Fort Worth, Tex., and Walter B. Raymond, Fort Payne, Ala., assignors to W. B. Davis Hosiery Mill, Inc., Fort Payne, Ala., a corporation of Alabama Application August 15, 1956, Serial No. 604,271

7 Claims. (Cl. 41—1)

The present invention relates to apparatus for applying markings or other indicia to stockings and other articles by a transfer process. In such a process the desired indicia are applied to a paper, plastic or other carrying medium, usually in strip or tape form, and then transferred to the stocking or other article. The transfer is effected by pressing the carrying medium against the article, usually with the application of heat.

In marking hosiery, transfers have heretofore been applied mostly by hand. An operator positions a transfer tape over the portion of the stocking where the transfer is desired and then applies pressure with a hot iron to transfer the marking to the stocking. While machines for marking stockings have been proposed, they have not come under general use because of their cost, complexity and their limitations in operation. In particular, difficulty has been experienced in securing consistently accurate registration between the transfer tape and the article to which the transfer is to be applied. Considerable skill has been required to operate such machines and even then the results have been disappointing.

It is an object of the present invention to provide apparatus for applying transfers to stockings and other articles which is simple and practical in its construction and operation and which assures proper positioning of the transfers of the articles without requiring particular skill in operating the machine. A further feature of the apparatus in accordance with the invention is that it is capable of operating continuously at a high rate of speed and hence has a high capacity. The effective capacity of the machine is further increased by its ability to apply two or more transfers to an article concurrently so that only a single passage through the machine is required.

Other objects and advantages of the transfer machine in accordance with the invention will appear from the following description and claims in conjunction with the accompanying drawings. While the invention is of general applicability in applying transfers to packaged and unpackaged articles, it is particularly useful in the hosiery industry and accordingly is shown by way of example in the drawings as a machine for applying transfers to socks.

In the drawings:

Fig. 1 is a plan of a machine in accordance with the invention for applying transfers to socks, end portions of the machine being broken away.

Figs. 2A, 2B and 2C are longitudinal vertical sections taken respectively on the lines 2A—2A, 2B—2B and 2C—2C in Fig. 1, the sections being on a larger scale than the plan.

Fig. 3 is a transverse vertical section taken approximately on the line 3—3 in Fig. 1.

Fig. 4 is a transverse vertical section taken approximately on the line 4—4 in Fig. 1.

Fig. 5 is a schematic view of a portion of a transfer tape as viewed from the side adapted to engage the article to which the transfer is to be applied.

Fig. 6 is a schematic edge view of a portion of the tape shown in Fig. 5, the thickness of the tape being exaggerated in order to represent it in the drawing.

As illustrated in the drawings, the apparatus in accordance with the invention comprises a conveyor 1 for moving socks along a selected path to receive transfers, a transfer tape feeding unit 2 including tape control gates, a transfer unit 3 for applying the transfers successively to socks on the conveyor and a take-up unit 4 which removes the extended tape and cooperates with the feeding unit and transfer unit in effecting movement of the tape in synchronism with the movement of the socks by the conveyor.

The conveyor 1 may be of any convenient type such as a rotating table or a series of plates carried by parallel chains. However, it is preferred to use a belt-type conveyor as it is simpler, less expensive and in general more satisfactory. As illustrated in the drawing, the conveyor comprises a frame 10 having leg portions 10a and longitudinally extending parallel side rail portions 10b. A conveyor belt 11 extends longitudinally of the frame and runs on spaced parallel drums 12, only one of which is shown in the drawings (Figs. 1, 2A and 3), the other drum being similar and being located to the right beyond the extent of the drawing in Fig. 1. Each of the drums 12 is rotatably mounted by means of a shaft 13 extending across between the side rail portions 10b of the frame. One of the drums 12 is suitably driven for example by means of a pulley 14, the pulley and drum both being fixed to the shaft 13 which is rotatably supported by bearings 15 carried by the frame. The conveyor belt 11 is driven continuously in the direction of the arrows i. e. from the left to right as viewed in Figs. 1, 2A, 2B and 2C. The upper run of the conveyor belt 11 is supported by a flat table top portion 16 that extends between the side rail portions 10b of the frame 10. While such support is desirable primarily in the locality of the transfer unit 3, the table top portion 16 is shown extending substantially the full length of the frame 10 except for portions above the drums 12 which are left open to permit the passage of the conveyor belt. A further table top portion 16a is provided beyond the end of the conveyor belt, at least at the entering end of the conveyor. In order that the upper run of the conveyor belt may be in tension, it is preferable to drive the drum 12 at the discharge end of the conveyor, but as this drum is not shown in the drawings, the driving pulley 14 has been illustrated as being on the shaft of the drum which is shown.

Socks S to which transfers are to be applied are fed to the conveyor belt 11 at the entering end of the conveyor, i. e. the left hand end in Figs. 1 and 2A. The socks are shown as being laid so that the foot portion of the socks extend approximately transversely of the conveyor belt, the leg portions hence being at an angle. While individual socks can be fed to the conveyor, the socks are shown as being arranged in pairs with the two socks of each pair joined by a top ticket 17. While the socks S are shown spaced approximately uniformly along the conveyor belt, uniform spacing is not necessary for the correct operation of the machine. The correct positioning of the transfers on the socks is not dependent on any predetermined spacing of the socks on the conveyor belt, hence, no particular skill is required in placing the socks on the belt.

The transfer tape feeding unit (Figs. 1, 2A and 3) comprises means for supporting one or more rolls of transfer tape T. The transfer tape T is ordinarily a thin paper tape or strip although other suitable materials may be used. On the transfer tape 2 there are spaced indicia I formed of suitable pigment and a carrier, the carrier and coloring medium being herein referred to as "transfer ink." The transfer ink is of such character as to be readily transferred from the tape to the article that is to be marked, for example a sock. In the example herein described, the transfer ink is heat responsive so that it can be transferred from the tape to the sock or other article by heat and pressure. The transfer ink forming the indicia is of substantial thickness as indicated schematically in Fig. 6 so that the combined thickness of the tape T and the indicia I is materially greater than that of the tape alone. As transfer tapes of the character herein used are known, further description is believed unnecessary.

As shown in the drawings, the components of the transfer tape feeding unit are mounted on a base plate 20 which extends transversely of the conveyor above the upper run of the conveyor belt 11 and is supported by the side rails 10b of the frame 10 by suitable posts 21. Two rolls or reels of transfer tape T are shown rotatably supported by a transverse shaft 22 carried by brackets 23 extending upwardly from the base plate 20. The reels are positioned on the shaft by means of flanged sleeves 24 held in adjusted position by thumb screws 24'. The shaft 22 is readily removable from the brackets 23 and the sleeves 24 are likewise removable from the shaft 22 to insert new rolls of tape.

Withdrawal of the transfer tape from the rolls on shaft 22 is controlled by control gate units 25 through which the tape passes after leaving the rolls. A control gate unit is provided for each of the tapes and hence two are illustrated in the drawings. Suitable guiding means, for example a transverse guide rod 26, may be interposed between the reels and the control gate units.

Each of the control gate units is shown as comprising a base plate 27 which is adjustably positioned on a base 28 by means of screws 29 extending through elongated slots provided in the base plate 27 and screwed into the base 28. The slots permit movement of the base plate 27 relative to the base 28 in a fore-and-aft direction with respect to the direction of movement of the tape, the base plate being secured in adjusted position by the screws 29. The base 28 is in turn adjustably supported by means of parallel rods 30 which extend transversely of the conveyor above the base plate 20 of the tape feeding unit and are supported near their ends by brackets 31. The rods 30 extend through holes in downwardly projecting flange portions 32 of the base 28. One of the rods also passes through a hole in a downwardly projecting sleeve portion 33 which is fixed to the base 28 and is tapped radially of the rod to receive a thumb screw 34 for locking the base in selected position. The base 28 is thus adjustable in a direction transverse to the direction of movement of the conveyor belt and the tape.

The tape is controlled by means of a gate 35 which is disposed transversely of the tape and extends vertically up through a slot in the adjustable base plate 27 directly above the gate 35. The tape T passes beneath the striking bar 36 and hence between the striking bar and the gate 35, being guided laterally by pins 37 that project upwardly from the base plate 27. The gate 35 is mounted for vertical movement by means of spaced parallel arms 38 which are pivotally connected at one end to opposite ends of the gate near its lower edge. The other ends of the arms 38 are pivotally mounted at 40 by brackets projecting downwardly from the base plate 27. The lower edge portion of the gate 35 is thus guided by the arms 38 while the upper edge portion is slidably guided by the edges of the slot in the base plate 27 through which the gate extends. A leaf spring 41 is mounted on a post 42 and acts upwardly against the lower edge of the gate 35, tending to move the gate upwardly. The upward movement of the gate is adjustably limited by means of stop screws 43. These screws are adjusted so that the space between the gate 35 and the striking bar 36—when the gate is in its uppermost position—is approximately equal to or slightly greater than the thickness of the tape T but less than the combined thickness of the tape and the indicia I. Hence when the gate 35 is in its uppermost position the tape T can be drawn through the control gate unit until one of the indicia I strikes the gate, whereupon the tape will be stopped.

Control mechanism is provided for moving the gate 35 downwardly at a selected time. The control mechanism is shown as comprising a lever 45 one end of which is pivotally supported at 46 by a bracket of the underside of the base plate 27. The lever 45 extends through a hole in the gate 35 and through a vertical slot in a guide bracket 47. The opposite end portion of the lever 35 lies under a draw bar 48 that extends transversely of the conveyor, being mounted for vertical movement. When, as shown in the drawings, there is a plurality of control gate units, all of the units may be actuated by a single draw-bar. End portions of the draw-bar 4 are pivotally connected to the armatures 49 of solenoids 50. When the solenoids 50 are energized, the draw bar 48 is moved downwardly. This in turn swings the levers 45 downwardly about their pivots and moves the gates 35 to open position to permit movement of the tapes T through the control gate units.

The transfer unit 3 is mounted above the conveyor 1 at a position following that of the tape feeding unit 2 in the direction of movement of the conveyor. It comprises a base plate 52 having a rectangular opening 53 and mounted by posts 54 on the side rail portions 10b of the frame. The base plate 52 extends transversely across and above the upper end of the conveyor belt 11. One or more electric transfer irons 55 are mounted on a draw bar 56 that extends lengthwise of the base plate 52 above the opening 53, two such irons being shown (Fig. 4). The draw bar 56 has a longitudinally extending slot 57 and each of the transfer irons is mounted on the draw bar by a bracket 58 having a vertical slot 59. A bolt 61 passes through the slots 57 and 59 of the draw bar and bracket respectively. The slots permit both vertical and lateral adjustment of the transfer irons 55 whereupon they are secured in position by tightening the bolts 61. Each of the transfer irons has a smooth lower face and an electrical heating element to which electricity is supplied by leads 62 connected to a suitable source. The irons are thermostatically controlled to maintain a selected temperature of proper value to effect the transfer of indicia from the transfer tapes T to the socks or other articles.

End portions of the draw bar 56 extend through longitudinal slots in vertical guide posts 63 that project upwardly from the base plate 52. Springs 64 in the hollow posts 63 act upwardly on the draw bar 56 to raise the transfer irons. L-shaped extensions 65 on the ends of the draw bar 56 extend upwardly and outwardly and are pivotally connected to the armatures 66 of solenoids 67 which are energized by means of leads 68.

A control unit 70 associated with the transfer unit 3 controls both the transfer irons and the control gates of the transfer tape feeding unit. The control unit 70 comprises a wheel or roller 71 rotatably mounted on the end of a lever 72 (Figs. 2B and 4) which is pivotally mounted at 73 on a bracket 74 that extends down from the base plate 52. The lever is preferably provided with several pivot holes to permit adjustment. The axis of the roller 71 is horizontal and transverse to the direction of movement of the upper end of the conveyor belt 11, the roller being adapted to roll along the conveyor belt. A light spring may be provided for keeping the roller in contact with the belt, although the weight of the roller is ordinarily sufficient for this purpose. The lever 72 carries an adjustable finger 75 that is engageable with the operating arm 76 of a microswitch 77 mounted on the under side of the base plate 52. The finger 75 is adjusted so that when the roller 71 is raised by rolling over a sock or other article on the belt 11 the microswitch is actuated. The microswitch 77 is connected by leads 78 to a suitable source of power and to the solenoids 77 of the transfer unit 3 and the solenoids 50 of the tape feeding unit 2 so that when the microswitch is actuated both sets of solenoids are energized.

The take-up unit 4 comprises a base plate 80 that extends transversely of the conveyor at a position following that of the transfer unit 3. The base plate 80 is supported above the conveyor by means of posts 81 and extends upwardly from the side rail portions 10b of the frame. A shaft 82 extends lengthwise above the base plate 80 and is rotatably supported at its ends by upstanding brackets 83. The shaft 82 is driven by a motor 84 through a worm 85 on the motor shaft engaging a worm wheel 86 fixed on the shaft. One or more take-up wheels 87—one for each tape—are rotatably mounted on the shaft 82. Each of the take-up wheels 87 is positioned lengthwise of the shaft by engagement of one end face of the wheel with a collar 88 which is fixed on the shaft in selected position, for example by a set-screw. A friction clutch disc 89 is pressed against the opposite end face of each take-up wheel by a spring 90 acting between the friction disc and a collar 91 fixed on the shaft in selected position to adjust the pressure of the spring. The friction disc 89 rotates with the shaft 82 and by a frictional engagement with the take-up wheel tends to rotate the wheel. The tape T runs over the take-up wheel 87 and under weighted rollers 92 which are rotatably supported by a shaft 93 carried by parallel arms 94 pivotally mounted on a shaft 95 which is parallel to the shaft 82 and supported at its ends by brackets 96. The rollers 92 by their weight, which may if desired be augmented by springs, press the tape against the take-up wheel 87 so as to exert a predetermined pulling action on the tape when the motor 84 is running.

In threading up the machine each tape from the roll on the shaft 22 passes under the guide rod 26, between the gate 35 and striking bar 36 of the respective control gate unit 25, under a vertically adjustable guide rod 97, under the respective transfer iron 55 of the transfer unit 3, under a further vertically adjustable guide rod 98, and between the respective take-up wheel 87 and weighted rollers 92 of the take-up unit 4. The tape has its ink side down. The direction of rotation of the take-up wheel is such as to tend to pull the tape in the direction of movement of the upper run of the conveyor belt 11. The speed at which the shaft 82 is rotated is such that if the take-up wheel 87 rotates at the same speed, it moves the tape faster than the conveyor belt. However, the friction clutch drive of the take-up wheel permits slipping when the tape is held stationary or is permitted to move only at a slower speed.

The operation of the machine will be clear from the foregoing description and following explanation. In setting up the machine for operation with a particular transfer tape, the control gate unit 25 is adjusted in a fore-and-aft direction so that when the gate is closed and engages one of the indicia on the tape, one of the preceeding indicia is directly under the respective transfer iron 55. The lateral position of the roll of tape, the control gate unit, the transfer iron and the take-up wheel are aligned with one another and are set to apply the transfer in selected position on the sock. With the conveyor belt and the take-up motor both running, socks are fed to the conveyor belt so as to lie on the belt in approximately the position shown in Fig. 1. Although the take-up motor is running, the tape is held by the control gate unit and hence does not move. When a sock reaches the transfer unit, the roller 71 of the control unit 70 rides up on the sock and thereby closes the microswitch 77. This energizes the solenoids 67 of the transfer unit to move the transfer iron down so as to press the heated iron surface against the back of the transfer tape. The heat and pressure of the transfer iron causes the ink on the transfer tape to be transferred to the sock. The closing of the microswitch also energizes the solenoids 50 of the control gate unit 25 so as to open the gate and thereby permit movement of the tape. The take-up wheel tends to move the tape faster than the conveyor belt. However, the pressure of the transfer iron and the stickiness of the transfer ink causes the transfer tape to move with the sock at the same speed as the conveyor belt. When the sock passes the roller 71 of the control unit 70, the roller drops down to the level of the conveyor belt and thereby opens the microswitch, deenergizing solenoids 67 and 50. The transfer iron is thereupon raised by the springs 64 and the control gate is closed by the spring 41. When the transfer iron is raised, the tape is freed from the sock and the take-up unit thereupon moves it faster than the conveyor belt until the next succeeding one of the indicia engages the control gate. This stops the tape with the next indicia, following the one that has been applied, directly under the transfer iron. The machine is then ready for the next sock to pass under the roller 71 of the control unit thereupon the cycle of operation is repeated.

It will be seen that the socks do not need to be placed uniformly spaced on the belt since the transfer irons under control of the control unit 70 effect a transfer whenever a sock reaches the transfer unit. It is hence unnecessary to have any special positioning devices on the conveyor belt and no particular skill is required in placing the socks on the belt. With the arrangement shown in the drawings two transfers are applied to the sock simultaneously, one on the toe portion and another on the heel portion. It will be understood that still additional transfers may be applied in like manner if desired.

While a preferred embodiment of the invention has been shown in the drawings and particularly described, it will be understood that the invention is in no way limited to this embodiment.

What we claim and desire to secure by Letters Patent is:

1. Apparatus for applying transfers to articles of hosiery, comprising a continuously moving conveyor for moving said articles along a predetermined path and supporting them during such movement, means for supplying a tape having spaced heat transfer indicia thereon, said indicia being of an appreciable thickness, take-up means exerting a continuous yielding pull on said tape for drawing said tape from said supplying means, guide means disposed between said tape supplying means and take-up means, said guide means and take-up means cooperating to guide said tape into juxtaposition to successive articles supported on said conveyor and to move the juxtaposed portion of said tape in the direction of said conveyor, heating and pressing means movable from a rest portion to an active portion to press a juxtaposed portion of said tape against an article on said conveyor and apply heat to said tape portion, actuating means for moving said heating and pressing means from rest to active position, gate means comprising a retractable gate member engageable with successive indicia on said tape to stop and hold said tape in predetermined position with one of said indicia between said heating and pressing means and said conveyor, said gate means being disposed between said tape supplying means and said heating and pressing means, and means controlling said gate means and said actuating means, said control means being disposed adjacent said conveyor and said heating and pressing means and being operable successively by said articles on said conveyor to retract said gate member to release said tape and to move said heating and pressing means from rest to active position when one of said articles is in predetermined position between said conveyor and said heating and pressing means.

2. Apparatus according to claim 1, in which said gate means and said actuating means are electrically operated and in which said control means comprises a switch, feeler means operating said switch and engageable by articles on said conveyor and means electrically connecting said switch with said gate means and actuating means.

3. Apparatus for applying transfers to articles, comprising conveying means for moving said articles along a predetermined path and supporting them during such movement, means for supplying a tape having spaced transfer indicia thereon, take-up means exerting a continuous pull on said tape for drawing said tape from said supplying means, guide means disposed between said tape supplying means and take-up means, said guide means and take-up means cooperating to guide said tape into juxtaposition to articles supported on said conveying means and to move said tape in the direction of movement of said articles, pressure means for pressing a juxtaposed portion of said tape against an article on said conveyor, gate means for stopping and holding said tape in predetermined position with one of said indicia between said pressure means and said conveying means, said gate means being disposed between said tape supplying means and said pressure means, and control means disposed adjacent said pressure means and operable by one of said articles to control said gate means to release said tape when one of said articles is in predetermined position between said conveyor and said pressure means.

4. Apparatus according to claim 3, in which said conveying means moves said articles continuously and in which said take-up means comprises a frictional drive tending to move said tape faster than said articles.

5. Apparatus according to claim 3 in which said gate means comprises a guide member, a gate member movable toward and away from said guide member, said tape passing between said gate member and said guide member, said gate member being biased to move toward said guide member to engage and hold said tape, and means controlled by said control means to retract said gate member to release said tape.

6. Apparatus according to claim 3, in which said pressure means is movable toward and away from said conveying means and further comprising actuating means controlled by said control means to move said pressure means toward said conveying means.

7. In apparatus for applying transfers to articles, means for supplying a continuous tape having spaced raised indicia therein, take-up means exerting a yielding pull on said tape to draw said tape from said supplying means, gate means disposed between said tape supplying means and said take-up means, said gate means comprising tape guiding and supporting means and a gate member movable toward and away from said supporting means between a closed position in which said gate member engages one of said raised indicia on the tape and thereby holds the tape stationary in predetermined position against the yielding pull of said take-up means and an open position in which said gate member releases the tape, means for moving said gate member between open and closed position and control means controlling movement of said gate member.

References Cited in the file of this patent

UNITED STATES PATENTS 2,286,458    Bowman et al. _____ June 16, 1942